United States Patent [19]

Rogers et al.

[11] Patent Number: 5,384,895
[45] Date of Patent: Jan. 24, 1995

[54] SELF-ORGANIZING NEURAL NETWORK FOR CLASSIFYING PATTERN SIGNATURES WITH 'A POSTERIORI' CONDITIONAL CLASS PROBABILITY

[75] Inventors: George W. Rogers, King George; Jeffrey L. Solka, Fredericksburg; Carey E. Priebe, King George; Wendy L. Poston, Fredericksburg, all of Va.

[73] Assignee: The United States of America as represented by the Secretary of the Navy, Washington, D.C.

[21] Appl. No.: 936,369

[22] Filed: Aug. 28, 1992

[51] Int. Cl.⁶ .............................................. G06K 9/62
[52] U.S. Cl. .......................................... 395/23; 395/24
[58] Field of Search ................................ 395/22, 23, 24

[56] References Cited

U.S. PATENT DOCUMENTS

| | | | |
|---|---|---|---|
| 4,912,653 | 3/1990 | Wood | 395/23 |
| 4,912,654 | 3/1990 | Wood | 395/23 |
| 4,912,655 | 3/1990 | Wood | 395/23 |
| 4,914,603 | 4/1990 | Wood | 395/23 |
| 4,914,708 | 4/1990 | Carpenter et al. | 395/24 |
| 4,941,122 | 7/1990 | Weideman | 395/22 |
| 4,990,838 | 2/1991 | Kawato et al. | 395/22 |
| 5,058,180 | 10/1991 | Khan | 395/24 |
| 5,157,738 | 10/1992 | Carpenter et al. | 395/23 |
| 5,175,796 | 12/1992 | Refregier et al. | 395/22 |
| 5,179,596 | 1/1993 | Weingard | 395/25 |
| 5,214,715 | 5/1993 | Carpenter et al. | 395/23 |

OTHER PUBLICATIONS

Jonathan et al, "Self-Organizing Neural Networks for Perception of Visual Motion", 1990.
Pao et al, "Adaptive Pattern Recognition and Neural Network" Ch. 7, 1989 Addison-Wesley.
NAVSWC TR 91-277, by Jeffrey L. Solka, George W. Rogers, Carey E. Priebe, Jun. 1991.

*Primary Examiner*—Robert W. Downs
*Assistant Examiner*—George Davis
*Attorney, Agent, or Firm*—Jacob Shuster

[57] ABSTRACT

A self-organizing neural network and method for classifying a pattern signature having N-features is provided. The network provides a posteriori conditional class probability that the pattern signature belongs to a selected class from a plurality of classes with which the neural network was trained. In its training mode, a plurality of training vectors is processed to generate an N-feature, N-dimensional space defined by a set of non-overlapping trained clusters. Each training vector has N-feature coordinates and a class coordinate. Each trained cluster has a center and a radius defined by a vigilance parameter. The center of each trained cluster is a reference vector that represents a recursive mean of the N-feature coordinates from training vectors bounded by a corresponding trained cluster. Each reference vector defines a fractional probability associated with the selected class based upon a ratio of i) a count of training vectors from the selected class that are bounded by the corresponding trained cluster to ii) a total count of training vectors bounded by the corresponding trained cluster. In the exercise mode, an input vector defines the pattern signature to be classified. The input vector has N-feature coordinates associated with an unknown class. One of the reference vectors is selected so as to minimize differences with the N-feature coordinates of the input vector. The fractional probability of the selected one of the reference vectors is the a posteriori conditional class probability that the input vector belongs to the selected class.

15 Claims, 4 Drawing Sheets

SELF-ORGANIZING NEURAL NETWORK FOR CLASSIFYING PATTERN SIGNATURES WITH 'A POSTERIORI' CONDITIONAL CLASS PROBABILITY

ORIGIN OF THE INVENTION

The invention described herein was made in the performance of official duties by employees of the Department of the Navy and may be manufactured, used, licensed by or for the Government for any governmental purpose without payment of any royalties thereon.

FIELD OF THE INVENTION

The invention relates generally to neural networks, and more particularly to a self-organizing neural network and method for adaptively training and processing same in order to classify pattern signatures and provide the 'a posteriori' conditional class probability that the pattern signature is from a selected class with which the neural network was adaptively trained.

BACKGROUND OF THE INVENTION

Artificial neural networks are powerful information processors conceptually based on the field of neurobiology as is well known in the art. Such networks strive to simulate biological neural network functions in computer architectures. In other words, an artificial neural network must correlate a wide variety of inputs to produce an output.

Recently, self-organizing neural network systems have been introduced for the field of pattern classification. Briefly, a self-organizing neural network is one that may be trained in an unsupervised fashion with a set of arbitrary sequences of training patterns. The neural network actively regulates the learning process to establish a set of output exemplar groupings of related training patterns. Each exemplar grouping has its boundaries governed by a specified tolerance or vigilance parameter as it is known. Once trained, the neural network processes a random input pattern to select one exemplar grouping that is most closely related to the input pattern. A more detailed description of this theory may be found in *Adaptive Pattern Recognition and Neural Networks*, Chapter 7: "Self-Organizing Nets for Pattern Recognition", by Yoh-Han Pao, Addison-Wesley, 1989. One implementation of a self-organizing neural network for pattern recognition is disclosed in U.S. Pat. No. 4,914,708 issued to Carpenter et al. on Apr. 3, 1990. However, prior art realization of such neural network pattern classification systems utilize an internal probability threshold to resolve how an input pattern will be classified. Accordingly, while the system output does yield a classification of the input pattern as it relates to the trained set of exemplar groupings, there is no degree of quality or confidence associated with the choice made by the neural network.

SUMMARY OF THE INVENTION

Accordingly, it is an object of the present invention to provide a self-organizing neural network for classifying pattern signatures and for providing 'a posteriori' conditional class probability that a pattern signature belongs to a particular class as a measure of classification quality.

Another object of the present invention is to provide a self-organizing neural network for classifying pattern signatures based on parallel processes in order to develop a neural network topology during a training phase, where the neural network topology provides 'a posteriori' conditional class probability during an exercise phase.

Yet another object of the present invention is to provide a self-organizing neural network for classifying pattern signatures that is suitable for direct hardware implementation.

Other objects and advantages of the present invention will become more obvious hereinafter in the specification and drawings.

In accordance with the present invention, a self-organizing neural network for classifying a pattern signature having N-features is provided. The network provides a posteriori conditional class probability that the pattern signature belongs to a selected class from a plurality of classes with which the neural network was trained. In its training mode, training means process a plurality of training vectors to generate an N-feature, N-dimensional space defined by a set of non-overlapping trained clusters. Each training vector has N-feature coordinates and a class coordinate. Each trained cluster has a center and a radius defined by a vigilance parameter. The center of each trained cluster is a reference vector that represents a recursive mean of the N-feature coordinates from training vectors bounded by a corresponding trained cluster. Each reference vector defines a fractional probability associated with the selected class based upon a ratio of i) a count of training vectors from the selected class that are bounded by the corresponding trained cluster to ii) a total count of training vectors bounded by the corresponding trained cluster. In the exercise mode, processing means receive an input vector defining the pattern signature to be classified. The input vector has N-feature coordinates associated with an unknown class. The processing means selects one of the reference vectors that minimizes differences with the N-feature coordinates of the input vector. The fractional probability of the selected one of the reference vectors is the a posteriori conditional class probability that the input vector belongs to the selected class.

DETAILED DESCRIPTION OF THE INVENTION

Figure 1:
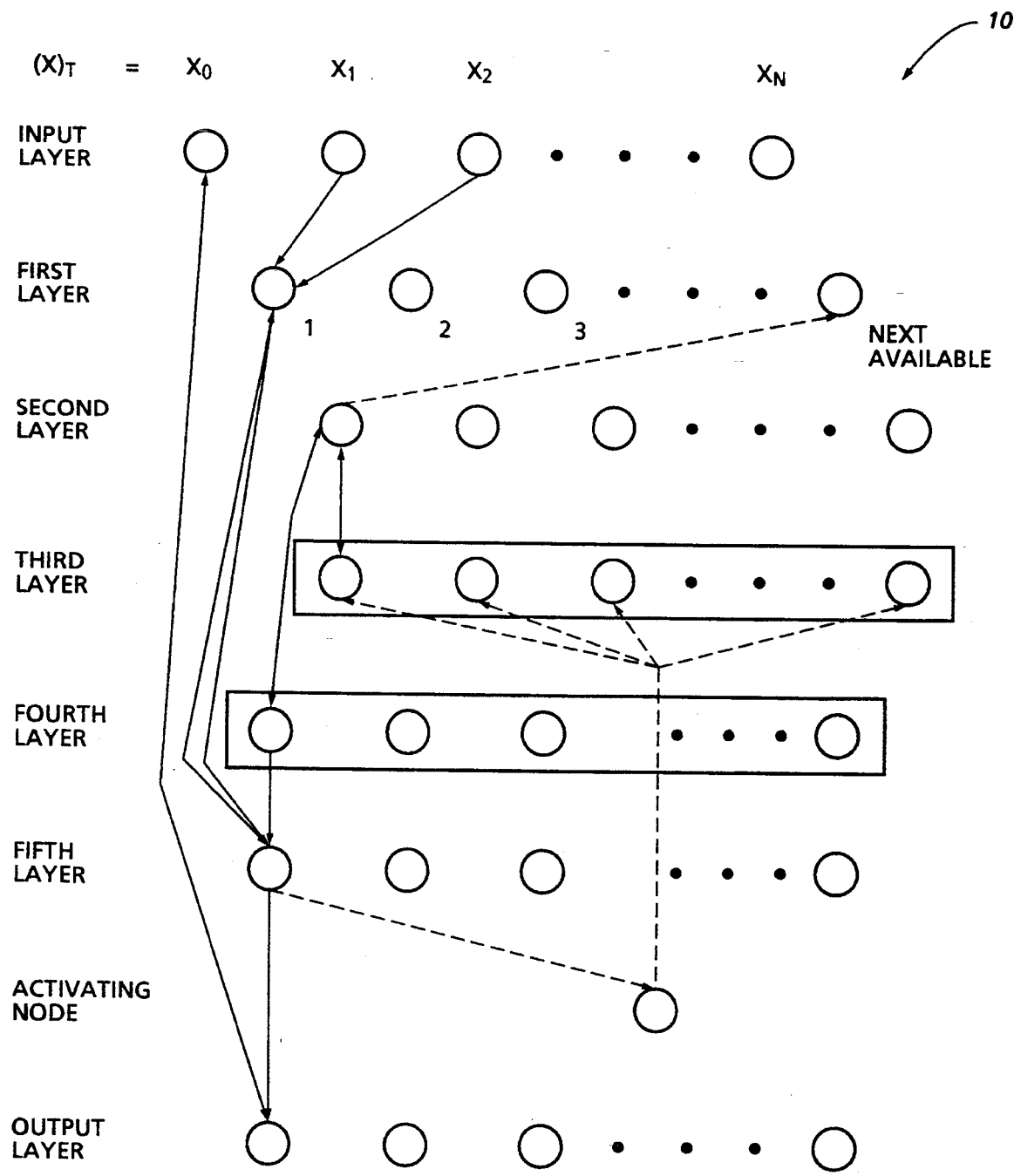
FIG. 1 depicts the neural network architecture according to the present invention as it applies to the training made thereof.
Figure 2:
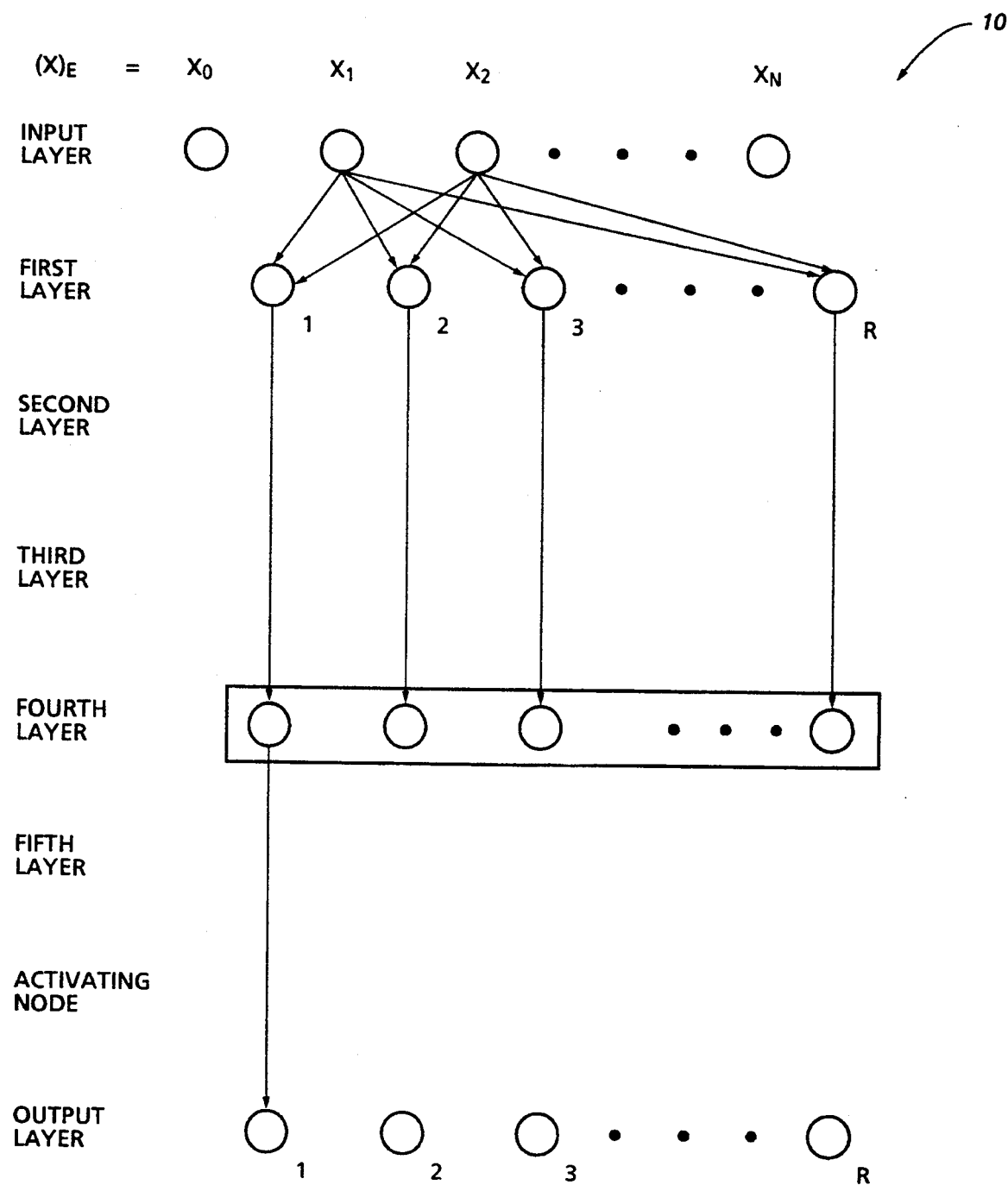
FIG. 2 depicts the neural network architecture according to the present invention as it applies to the exercise made thereof.

Referring now to the drawings, and in particular to FIGS. 1 and 2, an overview of the neural network according to the present invention will now be explained. FIG. 1 depicts a neural network architecture 10 as it applies to the training mode of the network and FIG. 2 depicts the same neural network architecture 10 of FIG. 1 as it applies to the exercise mode of the network.

During the training mode, network decision rules are developed. A plurality of known signature patterns in the form of an input vector $\{X\}_T$ are presented to network 10 for the training thereof at its INPUT LAYER. The INPUT LAYER performs no active processing and merely stages the input vector coordinates and passes same to the processing layers of network 10. The first coordinate of input vector $\{X\}_T$, i.e. $X_0$, identifies the class of each known signature pattern. For purposes of description, a signature pattern will belong to one of two classes designated class 0 and class 1. By way of illustrative example, class 0 might identify the male gender and class 1 might identify the female gender. However, it is to be understood that the present invention is not limited to two classes or these particular identifications as they are provided merely to facilitate an understanding of the present invention. The remaining coordinates of input vector $\{X\}_T$, i.e. $X_1, X_2, \ldots, X_N$, define N different features for each input vector. For the illustrative example used to describe the present invention, only two features (e.g. height and weight) will be defined. However, it is to be understood that the present invention may be extended to handle N features.

In the training mode shown in FIG. 1, network 10 performs the following basic steps for each signature pattern:

1) A new signature pattern $\{X\}_T$ is presented to the INPUT LAYER for purposes of training network 10. The class identifying coordinate $X_0$ is passed directly to the OUTPUT LAYER at the appropriate time step, while the feature coordinates $X_1$ and $X_2$ for the illustrative example (and up through $X_N$ generally) are passed to a plurality of nodes indexed from 1 to R residing on the FIRST LAYER of network 10. For purposes of clarity and simplicity, feature coordinates $X_1$ and $X_2$ are shown as being passed only to node 1 on the FIRST LAYER. Accordingly, lines of connection between nodes will be restricted to those originating from node 1 on the FIRST LAYER.

Figure 3:
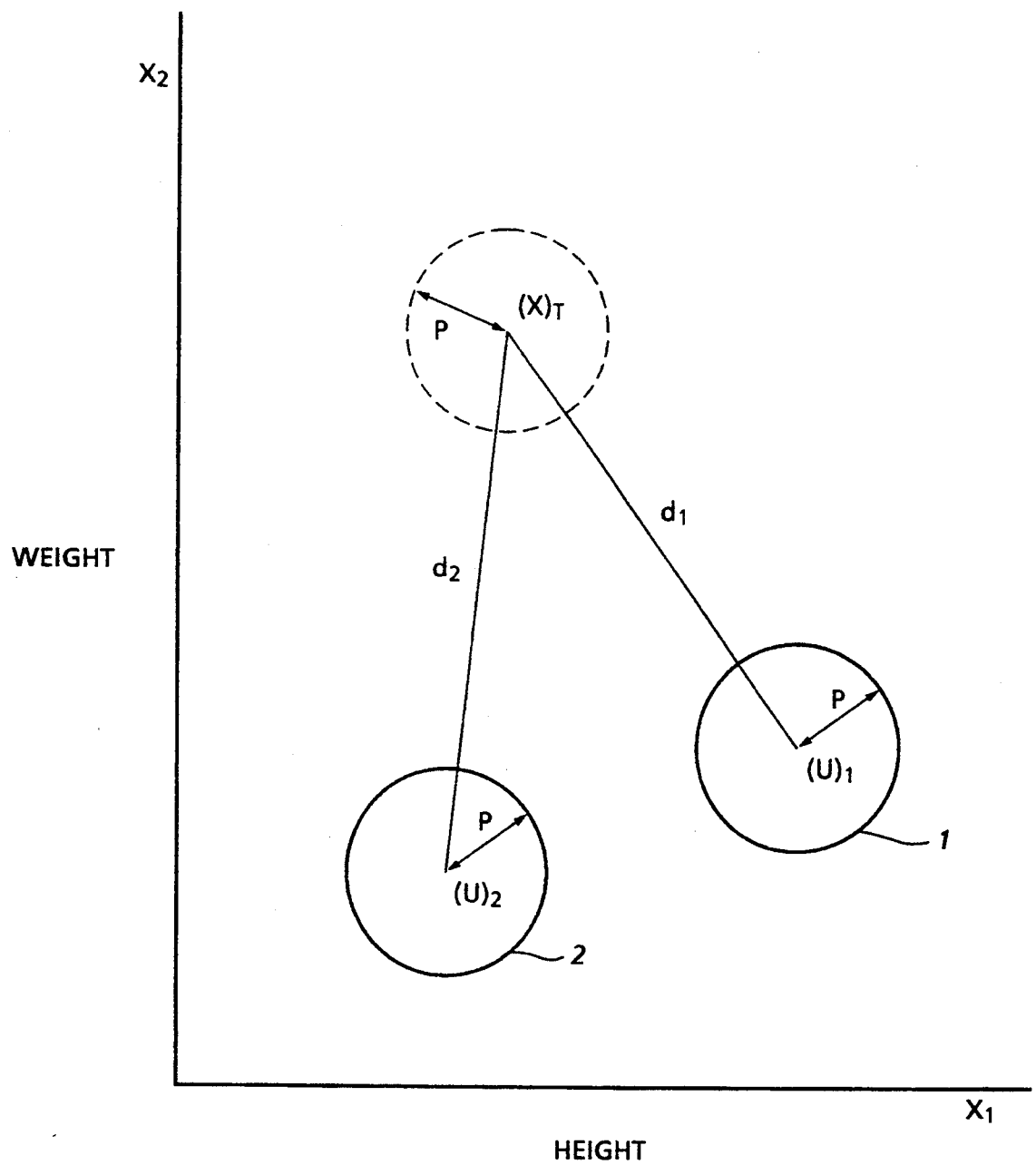
FIG. 3 depicts a two-dimensional feature space used to illustrate the operation of the present invention.

2) Each inactive FIRST LAYER node stores a constant whose function will be explained further hereinbelow. Each active FIRST LAYER node stores an exemplar or reference vector that defines two feature coordinates for the illustrative example and, in general, N feature coordinates. The reference vector $\{\mu\}$ defines a center or mean value of a cluster of previously processed input vectors. The boundaries of the cluster are defined by a given vigilance parameter which may be thought of as the radius of the cluster. For the illustrative example, this is easily visualized by referring to FIG. 3 where the two features, height and weight are used to define a two-dimensional feature space. The circles or clusters 1, 2, ... have reference vectors $\{\mu\}_1$, $\{\mu\}_2$, ... as respective centers and each cluster 1, 2, ... has a radius or vigilance parameter $\rho$. For each input vector $\{X\}_T$ processed during the training mode, the FIRST LAYER nodes calculate the distance $d_1, d_2, \ldots$ between the input vector and each of the reference vectors $\{\mu\}$. The distance may be calculated by using one of the well known Euclidean, Manhattan or Mahalanobis distance metrics as described by Jeffrey L. Solka et al. in *Error Measures for Object Misalignments in Pixel Space Representations*, Naval Surface Warfare Center TR91-227, 1991.

3) Each calculated distance $d_1, d_2, \ldots$ is passed to the FOURTH LAYER (only the distance $d_1$ is shown as being passed to the FOURTH LAYER in FIG. 1) where the minimum distance calculated in step 2) is determined. One way of selecting the minimum distance is through the use of a MAXNET processor as described in the aforementioned textbook by Yoh-Han Pao at page 173. Use of a MAXNET processor is indicated in the drawings by a rectangle encompassing a layer of nodes.

4) The minimum distance determined in step 3) (for the example in FIG. 1, assume that $d_{min}=d_1$) is passed to the FIFTH LAYER nodes, each of which is biased with the given vigilance parameter $\rho$. If the minimum distance is less than the vigilance parameter (i.e. bounded by an existing cluster): i) the reference vector associated with the existing cluster is combined with the input vector in the FIRST LAYER to effectively create a new cluster having a changed center, and ii) the 'a posteriori' conditional class probability is updated in the OUTPUT LAYER as will be explained in greater detail hereinbelow. If, however, the minimum distance is greater than the vigilance parameter (e.g. not bounded by an existing cluster as is true for the case shown in FIG. 3), a new cluster must be created as indicated by the dashed line circle in FIG. 3. The new cluster has its center or reference vector defined by the current input vector and a radius defined by the vigilance parameter $\rho$. In terms of the network 10, creation of the new node is indicated by the dashed lines of connection beginning with the line to the ACTIVATING NODE. This process will be explained further hereinbelow.

5) If a new node is to be created, the reference vector associated therewith is passed through the (bookkeeping) THIRD and SECOND LAYERS so that the NEXT AVAILABLE FIRST LAYER node is activated with the newest reference vector.

In the exercise mode shown in FIG. 2, network 10 performs the following basic steps for each signature to be classified:

1) The signature pattern $\{X\}_E$ to be classified is presented to network 10 via the INPUT LAYER as in the training mode. However, unlike the training mode, the class coordinate associated with the features defined by the input vector $\{X\}_E$ is unknown.

2) The FIRST LAYER nodes calculate the distance (e.g. Euclidean distance, etc.) between the input vector $\{X\}_E$ and each of the R reference vectors generated during the training mode.

3) The FOURTH LAYER nodes select the minimum distance calculated by the FIRST LAYER thereby finding the node in the FIRST LAYER having the reference vector that is closest to the input vector $\{X\}_E$.

4) The winning node from the FOURTH LAYER activates a correspondingly indexed node in the OUTPUT LAYER. The OUTPUT LAYER provides the 'a posteriori' conditional class probability that the pattern signature represented by the input vector $\{X\}_E$ belongs to one of the classes with which network 10 was trained.

A more detailed explanation of the neural network layers will now be presented as it applies to the training mode of the present invention. The initial values of the nodes at the various layers are listed in TABLE 1 and a clocking summary of the time steps needed to process one input vector $\{X\}_T$ is listed in TABLE 2.

TABLE 1

| Initial Values for Network Layers | |
|---|---|
| Layer | Initial Values |
| First | All nodes are 0 |
| Second | All nodes are 0 |
| Third | All nodes are 1 |
| Fourth | All nodes are 0 |
| Fifth | All nodes are 0 |
| Activation | 0 |

TABLE 1-continued

| Initial Values for Network Layers | |
|---|---|
| Layer | Initial Values |
| Output | All nodes are 0 |

TABLE 2

| Clocking Summary. | |
|---|---|
| Layer | Completion Time |
| Input | m |
| First | m + 1/m + 7 |
| Second | every clock cycle |
| Third | every clock cycle<br>Maxnet on m + 5 |
| Fourth | m + 2/m + 8 |
| Fifth | m + 3/m + 9 |
| Activation | m + 4/m + 10 |
| Output | m + 11 |

The network takes eleven time steps to complete the processing of an input vector in the training mode. Accordingly, a clocking cycle begins at time m and continues on until (m+11), where m=0 is indicative of the beginning of the training mode.

Referring again to FIG. 1 and TABLES 1 and 2, an input vector $\{X\}_T$ is staged at the INPUT LAYER at time m. At time (m+1) where m=0, the FIRST LAYER nodes are initialized to zero. Thus, the FIRST LAYER nodes must be initialized with reference vectors as the network is trained. At time (m+1) where m>0, the FIRST LAYER nodes calculate a distance (e.g. Euclidean distance, etc.) between the input vector $\{X\}_T$ and the reference vectors stored in the FIRST LAYER nodes. In general, the output of the FIRST LAYER is $$y_{2j}(t_{m+k}) d(w_i, \mu_{ji}(t_{m+k}), x_i(t_{m+k})) + \{1 - y_{2j}(t_{m+k})\} y_1^{max} \quad (1)$$

where d is some distance function. Specifically, for the Euclidean distance $$y_{1j}(t_{m+k+1}) = y_{2j}(t_{m+k}) \sum_{i=1}^{N} (w_i^2 [\mu_{ji}(t_{m+k}) - x_i(t_{m+k})]^2) + [1 - y_{2j}(t_{m+k})] y_1^{max} \quad (2)$$

where $Y_{ij}$ is the FIRST LAYER output from the j-th node, t is time, k is the clocking index from 0 to 11, $y_{2j}$ is the SECOND LAYER output from the j-th node, $w_i$ is a weighting factor, $\mu_{ji}$ is the i-th component of the reference vector $\{\mu\}$ associated with the j-th node, and $y_1^{max}$ is a constant greater than the vigilance parameter $\rho$. As equation (2) indicates, the first term will be zero for any nodes not yet activated with a reference vector since the SECOND LAYER nodes are initialized to zero. This yields a $y_{1j}$ output of $y_1^{max}$ for the j-th node not yet activated. As will be explained further hereinbelow, this ensures that an inactive FIRST LAYER node cannot be chosen by the FOURTH LAYER as having the minimum distance value. However, for existing clusters, the output $y_{1j}$ is equal to the distance between the input vector $\{X\}_T$ and each of the existing reference vectors $\{\mu\}$. Each $y_{1j}$ output is sent to the FOURTH and FIFTH LAYERS for processing at clock cycles (m+2) and (m+3), respectively. Note that equation (2) uses the Euclidean distance metric. For the remainder of the description, it will be assumed that this is the distance metric.

The nodes in the SECOND LAYER are status nodes that keep track of corresponding nodes in the FIRST, THIRD and FOURTH LAYERS that are active. Thus, nodes in the SECOND LAYER are updated every clock cycle. The SECOND LAYER nodes are initialized to zero to signal the inactive state. On every ensuing clock cycle, the SECOND LAYER nodes are updated in value and send out a signal using the equation $$y_{2j}(t_k) = \theta\{y_{2j}(t_{k-1}) + 1 - y_{3j}(t_{k-1}) - \epsilon\} \quad (3)$$

where $\theta\{f\}$ is the Heaviside step function, i.e., $\theta\{f\}=1$ for $f>0$ and $\theta\{f\}=0$ for $f\leq 0$, and $\epsilon$ is a biasing constant that is less than 1/R where R is the total number of nodes available.

The nodes in the THIRD LAYER serve as a means of making the next available node selection in an orderly fashion. In other words, when a new cluster is to be created and a node is to be activated in association therewith, the THIRD LAYER provides the means for selecting a SECOND LAYER node which is inactive and has the lowest index. Specifically, the THIRD LAYER nodes send inhibitory signals to the nodes in the SECOND LAYER that are inactive (i.e. set at zero). To accomplish this, the THIRD LAYER nodes are initially determined according to an offset function $$o_{3j} = (1 - j\epsilon) \quad (4)$$

which automatically gives the THIRD LAYER nodes having lower indices a higher offset value. The offset values in equation (4) are updated for each j-th node on every clock cycle using $$o_{3j}(t_k) = [1 - y_{2j}(t_{k-1})][1 - j\epsilon], \ k > 0 \quad (5)$$

When a new cluster must be created thereby requiring the activation of a new node, a process such as the MAXNET process is initiated to determine the minimum indexed node which is active in the THIRD LAYER. This equates to the minimum indexed node in the SECOND LAYER which is currently inhibited. The output of the MAXNET process is $Z_{3j}=1$ for $j_{min}$ and $Z_{3j}=0$ for $j\neq j_{min}$, where $j_{min}$ is the winning node from the MAXNET process. The overall output for a THIRD LAYER node is given by $$y_{3j}(t_k) = \theta\{y_{3j}(t_{k-1}) - \epsilon - Z_{3j}(t_k), \ k > 0 \quad (6)$$

As explained above, the nodes in the FOURTH LAYER are applied in a MAXNET process to find the j-th node with the minimum Euclidean distance from the nodes in the FIRST LAYER. Note that FIRST LAYER nodes are defined by either a reference vector $\{\mu\}$ or the constant $y_1^{max}$. The output of each node in the FOURTH LAYER is governed by $$Y_4(t_{m+k+1}) = \text{MAX}\left(\frac{y_{2j}(t_{m+k})}{1 + y_{1j}(t_{m+k})}\right), \ k = 1, 7 \quad (7)$$

After the winning node has been found, the results (i.e., 1 for the winning node, 0 for all others) are output to the FIFTH LAYER. However, for the first input vector used in the training mode, no nodes are yet committed to (or activated with) a reference vector and the output of the FOURTH LAYER is 0 for all nodes. This occurs on clock cycles where k=1 corresponding to the forward pass of the input vector to the FOURTH LAYER, and k=7 corresponding to the node commitment cycle.

The nodes in the FIFTH LAYER check the minimum Euclidean distance (associated with the winning node from the FOURTH LAYER) against the vigilance parameter $\rho$ as given by $$y_{5j}(t_{m+k+1}) = y_{4j}(t_{m+k})\theta\{\rho - y_{1j}(t_{m+k})\}, \; k=2,8 \quad (8)$$

If the minimum Euclidean distance found passes the test in equation (8), the output from the FIFTH LAYER node (corresponding to the winning node from the FOURTH LAYER) is a 1, while all the remaining nodes output a 0. If the minimum Euclidean distance fails the test in equation (8), the output of all the FIFTH LAYER nodes is 0.

The ACTIVATING NODE forms the quantity $$\delta_a(t_{m+k+1}) = 1 - \sum_{j=1}^{N} y_{5j}(t_{m+k}), \; k = 3, 9 \quad (9)$$

based on the outputs of the FIFTH LAYER. When $\delta_a = 1$, a new node must be activated with the current input vector. Thus, when $\epsilon_a = 1$, the new node commitment process is triggered beginning at the THIRD LAYER as described above. If the ACTIVATING NODE returns a value of 0, then the new node commitment process is not required and one of the existing nodes is to be updated.

The OUTPUT LAYER nodes are activated by the nodes in the FIFTH LAYER. However, only one OUTPUT LAYER node is activated at a given time since only one node from the FIFTH LAYER can output a 1. Thus, the OUTPUT LAYER (designated by the subscript "6") is governed by $$y_{6j}(t_{m+k+1}) = \left[\frac{n_{6j}y_{6j}(t_{m+k})}{n_{6j}+1} + \frac{X_0(t_m)}{n_{6j}+1}\right]y_{5j}(t_{m+k-1}) + \quad (10)$$

and $$y_{6j}(t_{m+k})[1 - y_{5j}(t_{m+k-1})]$$

$$n_{6j} \rightarrow n_{6j} + y_{5j}(t_{m+k-1}), \; k = 10 \quad (11)$$

where $n_{6j}$ is a counter incremented by 1 each time the j-th node is activated by its corresponding FIFTH LAYER node, and $X_0$ indicates the class membership of the input vector. Note that the application of equation (10) assumes that class membership is binary valued, i.e. $X_0 = 0$ denotes class 0 and $X_0 = 1$ denotes class 1. In this way, the OUTPUT LAYER nodes are updated with respect to the number of occurrences of each class within a trained cluster. Specifically, the output node estimates the local posterior probability of obtaining a training vector from class 1. The extension of this process to the calculation of posteriori probabilities for multiple classes can be accomplished in a straightforward manner.

When an input vector $\{X\}_T$ lies within the boundaries of an earlier defined cluster, the input vector is combined with the reference vector of that cluster in the FIRST LAYER according to a recursive mean calculation $$\mu_{ji}(n_j + 1) = \mu_{ji}(n_j)\left[\frac{n_j}{n_j+1}\right] + \frac{X_i}{n_j+1} \quad (12)$$

where $\mu_{ji}(n_j)$ is the recursive mean value of the i-th component of the j-th reference vector $\mu$ formed by $n_j$ previous input vectors. Accordingly, $n_j$ serves as a counter that is incremented by 1 each time a cluster's reference vector is updated with an input vector, regardless of the class associated with the input vector. This count is made available at the OUTPUT LAYER in order to determine the 'a posteriori' conditional class probability during the exercise mode.

Once trained, the network is ready to receive an input vector $\{X\}_E$ in the exercise mode which means there is no class identification. Processing of the N-featured input vector proceeds to an OUTPUT LAYER node as described above. The OUTPUT LAYER returns the 'a posteriori' conditional class probability that the input vector belongs to a selected one of the classes used to train the network. More specifically, using the notation from above, the OUTPUT LAYER node activated by the MAXNET process of the FOURTH LAYER returns the fractional probability $y_{6j}(t_{m+k+1})$. In this way, the user obtains the probability (based on training) associated with a class. This provides the distinct advantage that an overt level of confidence in classifying pattern signatures may be achieved. This is a great improvement over the prior art where internal thresholding has been used to predict class membership based on prior training without any level of overt confidence being provided.

Figure 4:
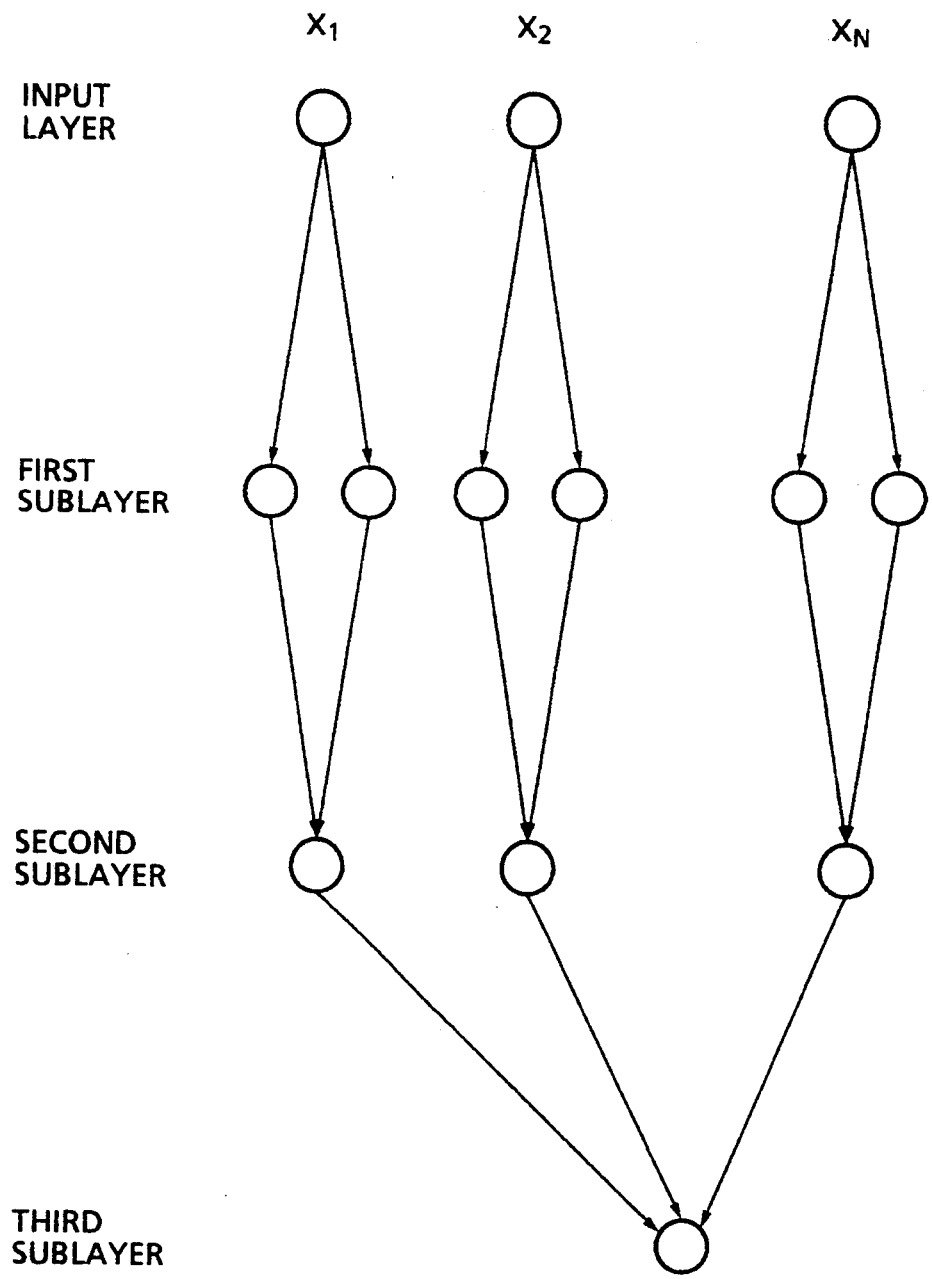
FIG. 4 depicts a neural network realization of a Euclidean distance metric used by the present invention.

For the embodiment described, the Euclidean distance metric was used. A neural network realization of the Euclidean distance metric is a composite processor shown in FIG. 4. The values at the sublayers of the composite processor are as follows:

| FIRST SUBLAYER | |
|---|---|
| $y_{1ji}^{S1} = \mu_{ji} - X_i$ | (13) |
| SECOND SUBLAYER | |
| $y_{1ji}^{S2} = (y_{1ji}^{S1})^2$ | (14) |
| THIRD SUBLAYER | |
| $y_{1j}^{S3} = \sum_{i=1}^{N} y_{1ji}^{S2}$ | (15) | where S1, S2, and S3 indicate the FIRST, SECOND and THIRD SUBLAYERS, respectively. Although the invention has been described relative to a specific embodiment thereof, there are numerous variations and modifications that will be readily apparent to those skilled in the art in the light of the above teachings. It is therefore to be understood that, within the scope of the appended claims, the invention may be practiced other than as specifically described.

What is claimed as new and desired to be secured by Letters Patent of the United States is:

1. A self-organizing neural network for classifying an N-feature pattern signature with a posteriori conditional class probability that the pattern signature belongs to a selecting class from a plurality of classes, comprising:
   a first plurality of processing layers for storing each of a first plurality of training vectors as non-overlapping clusters, each of said first plurality of training vectors having N-feature coordinates and a class coordinate, each of said non-overlapping clusters having a center and a radius defined by a vigilance parameter, wherein the center of each of said non-overlapping clusters is a reference vector, wherein the reference vector associated with each of said non-overlapping clusters is successively indexed and is equal to a corresponding one of said first plurality of training vectors, said first plurality of processing layers updating one cluster from said non-overlapping clusters and storing said first plurality of training vectors when one of a second plurality of training vectors has corresponding N-feature coordinates bounded by the radius of said one cluster, wherein N-feature coordinates of a cluster's reference vector are recursively combined with N-feature coordinates of said one of said second plurality of training vectors having corresponding N-feature coordinates bounded by the radius of said one cluster, wherein a plurality of trained clusters are generated using said first and second plurality of training vectors, said first plurality of processing layers determining i) a count of training vectors associated with the selected class that are bounded within each of said plurality of trained clusters, and ii) a total count of training vectors bounded within each of said plurality of trained clusters, wherein each of said plurality of trained clusters has a reference vector that defines a fractional probability associated with the selected class based upon a ratio of i) said count of training vectors associated with the selected class to ii) said total count of training vectors bounded by a corresponding one of said plurality of trained clusters; and means for processing an input vector defining the pattern signature to be classified, the input vector having N-feature coordinates associated with an unknown class, said processing means for selecting one of reference vectors associated with said plurality of training vectors that minimizes differences with the N-feature coordinates of the input vector, wherein a fractional probability of the selected one of the reference vectors is the a posteriori conditional class probability that the input vector belongs to the selected class.

2. A neural network as in claim 1 wherein said processing means minimizes differences with the N-feature coordinates of the input vector using a distance metric.

3. A neural network as in claim 2 wherein the distance metric is a Euclidean distance metric.

4. A neural network as in claim 2 wherein the distance metric is a Manhattan distance metric.

5. A neural network as in claim 2 wherein the distance metric is a Mahalanobis distance metric.

6. A neural network as in claim 1 wherein said processing means comprises:

means for generating feature difference measurements for each of the reference vectors associated with said plurality of trained clusters, wherein a feature difference measurement is a distance between the N-feature coordinates of each of the reference vectors associated with said plurality of trained clusters and the NS feature coordinates of the input vector; and means for selecting a minimum feature distance measurement for the input vector.

7. A neural network as in claim 6, wherein said means for selecting the minimum feature difference measurement is a Maxnet processor.

8. A neural network as in claim 1 wherein said first plurality of processing layers includes a composite processor for determining a Euclidean distance between each of said second plurality of training vectors and each of said non-overlapping clusters.

9. A neural network as in claim 1 further comprising:

an input layer of staging nodes for storing the N-feature coordinates and the class coordinate for each of said first and second plurality of training vectors; and an output layer of nodes, each output layer node for identifying the selected class and the a posteriori conditional class probability.

10. A neural network as in claim 1 wherein said processing means comprises:

said first plurality of processing layers for determining differences between the N-feature coordinates of the input vector and each of the reference vectors associated with said plurality of trained clusters; and a second plurality of processing layers for selecting the one reference vector that minimizes the differences.

11. A method, utilizing a self-organizing neural network, for classifying an N-feature pattern signature with a posteriori conditional class probability that the pattern signature belongs to a selecting class from a plurality of classes, comprising the steps of:

storing each of a first plurality of training vectors as non-overlapping clusters in a first plurality of processing layers, each of said first plurality of training vectors having N-feature coordinates and a class coordinate, each of said non-overlapping clusters having a center and a radius defined by a vigilance parameter, wherein the center of each of said non-overlapping clusters is a reference vector, wherein the reference vector associated with each of said non-overlapping clusters is successively indexed and is equal to a corresponding one of said first plurality of training vectors;

updating one cluster from said non-overlapping clusters and storing said first plurality of training vectors when one of a second plurality of training vectors has corresponding N-feature coordinates bounded by the radius of said one cluster, wherein said step of updating is defined as N-feature coordinates of a cluster's reference vector being recursively combined with N-feature coordinates of said one of second plurality of training vectors having corresponding N-feature coordinates bounded by the radius of said one clusters, wherein a plurality of trained clusters are generated using said first and second plurality of training vectors;

determining i) a count of training vectors associated with the selected class that are bounded within each of said plurality of trained clusters, and ii) a total count of training vectors bounded within each of said plurality of trained clusters, wherein each of said plurality of trained clusters has a reference vector that defines a fractional probability associated with the selected class based upon a ratio of i) said count of training vectors associated with the selected class to ii) said total count of training vectors bounded by a corresponding one of said plurality of trained clusters;

determining, using the first plurality of processing layers, a difference between N-feature coordinates of an input vector and each of the reference vectors associated with said plurality of trained clusters; and selecting, using a second plurality of processing layers, one of reference vectors associated with said plurality of training vectors that minimizes said difference, wherein a fractional probability of the selected one of the reference vectors is the a posteriori conditional class probability that the input vector belongs to the selected class.

12. A method according to claim 11 wherein said step of selecting minimizes differences with the N-feature coordinates of the input vector using a distance metric.

13. A method according to claim 12 wherein the distance metric is a Euclidean distance metric.

14. A method according to claim 12 wherein the distance metric is a Manhattan distance metric.

15. A method according to claim 12 wherein the distance metric is a Mahalanobis distance metric.

* * * * *